J. BEDARD.
PROTECTOR FOR WINDSHIELDS.
APPLICATION FILED MAY 20, 1919.
1,345,826. Patented July 6, 1920.
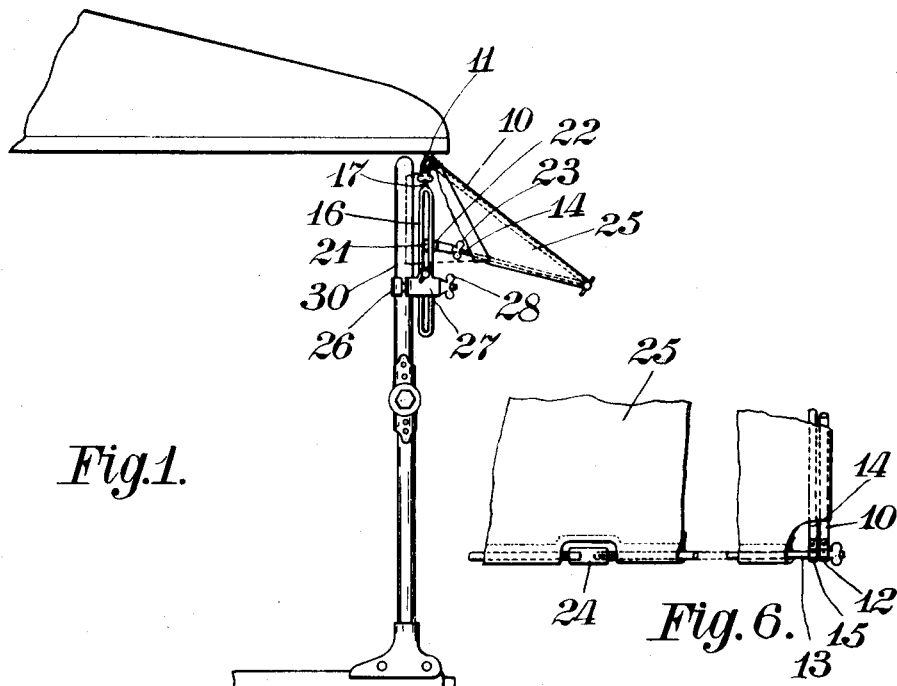
Fig.1.
Fig.6.
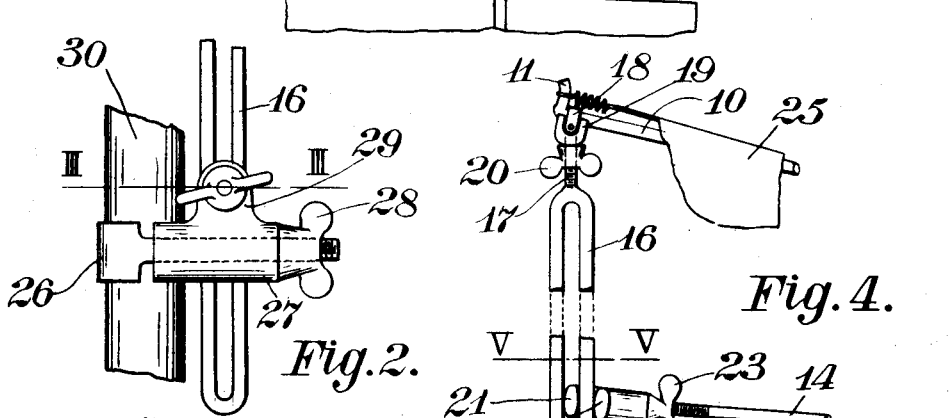
Fig.2. Fig.4. Fig.5.
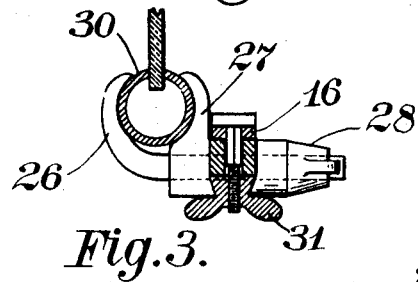
Fig.3.
Inventor
Joseph Bedard
his Attorneys

UNITED STATES PATENT OFFICE.

JOSEPH BEDARD, OF COLUMBUS, OHIO.

PROTECTOR FOR WINDSHIELDS.

1,345,826.   Specification of Letters Patent.   Patented July 6, 1920.

Application filed May 20, 1919. Serial No. 298,390.

*To all whom it may concern:*

Be it known that I, JOSEPH BEDARD, a citizen of the United States, residing at Columbus, in the county of Franklin and State of Ohio, have invented a certain new and useful Improvement in Protectors for Windshields, of which the following is a specification.

The object of this invention is to provide improved means for protecting the wind shield of an automobile from snow, rain or glare tending to interfere with a good comfortable view of the road by the driver.

The invention consists generally stated in the provision of an opaque hood or awning projecting forward of the regular "top" and preferably embodying means whereby the same may be readily attached to and removed from the wind shield frame as hereinafter set forth and claimed.

In the accompanying drawings illustrating one example of the invention—

Figure 1 is a view in side elevation showing the invention applied to a wind shield.

Fig. 2 is a detailed side view on a larger scale of the clamp for attaching the device to the wind shield frame.

Fig. 3 is a horizontal section on the line III—III Fig. 2 looking down.

Fig. 4 is a detail side view on a larger scale of parts for supporting the frame.

Fig. 5 is a sectional view on the line V—V Fig. 4.

Fig. 6 is a plan view of the forward part of the frame.

In the views 10 designates the upper side bars of the frame, said bars having hooks 11 at their rear ends and hinged loops 12 at their forward ends to receive the front cross bar 13. The character 14 designates the lower side bars which are also provided at their forward ends with hinged loops 15 to receive the front cross bar 13.

The rear ends of the upper and lower side bars 10 and 14 are supported by means of a pair of slotted bars like that shown at 16. The upper end of each of said slotted bars 16 is provided with a threaded stem 17 and a pivoted loop 18 to receive the upper side bar 10 at its rear end. On the threaded stem below the loop 18 is a yoke 19 having seats to engage the side bar and on said stem below the yoke is a thumb nut 20 by turning which upward against the yoke the side bar 10 is pinched by the yoke and loop and consequently the parts fixed from movement with reference to each other. Each of the lower side bars 14 has threaded on its rear end a clamping member 21 to reach into the slot of the corresponding bar 16 and engage the forward part of that bar; and sliding on the shank of said clamping member 21 is an opposing clamping member 22 to engage the forward edge of the said bar 16. A thumb nut 23 threaded on the bar 14 forward of the shank of the clamping member 22 functions to bind the two clamping members 21 and 22 to the slotted bar and consequently to fix the rear end of the bar 14 in position after proper adjustment with relation to said slotted bar.

The front cross bar 13 is made in two parts united by a threaded union 24, said union being pinned to one of the parts so that the other can be separated. The frame thus constructed is provided with a covering 25 of suitable flexible fabric preferably of opaque material, the same extending over the top and sides and being hemmed along the forward edge to form a pocket to receive the front bar 13 and similarly along the edges of the side pieces to receive the lower side bars 14. The rear edge of the top of said covering 25 is provided with rather strong coil springs attachable to the hooks 11 to hold the covering drawn taut on the frame.

In effect the slotted bars 16 are standards for supporting the protector. The standards are connected with the end of the upper section of the wind shield frame 30 by means of a clamp comprising a rear member 26 on the threaded shank of which slides a forward opposing member 27, the two members being held embracing the wind shield with a thumb nut 28 on the said threaded shank. On the sliding part 27 is an upwardly extending portion 29 perforated with a square hole through which is passed a T-member having its shank for a portion of its length squared to fit in said square hole so that the head of said T-member shall stand cross-wise of the slot of the slotted bar 16. The end of the shank of the T-member is threaded to receive a thumb nut 31 for fixing the slotted bar or standard to the portion 29. The clamping members engaging the wind shield frame and the T-member are to be left permanently upon the shield. The slotted bars or standards can be attached by loosening the thumb nut 31 and turning those bars or standards to horizontal position so that the slot of the standard shall pass beyond the cross head of the T-member after which the standard is turned to upright position and raised or lowered to proper position and clamped. Of course, the T-member can be entirely removed and applied if the standard be placed in upright position as desired.

From the foregoing it will be observed that, if desired, the frame and its cover can be removed and folded into a very compact condition for transportation in the automobile when not needed as a protection for the wind shield.

The forms of the parts can be varied without departing from the invention as claimed.

What I claim is:

1. A wind shield protector including, in combination, a pair of upright standards and means for adjustably attaching the same to the ends of the wind shield frame, a forwardly extending frame including upper and lower side bars secured in hinged relation to each other at their forward ends said upper bars hinged at their rear ends to the upper portions of said standards, means adjustably connecting the rear ends of said lower bars to said standards, and a flexible cover for the upper portion of said forwardly extending frame.

2. A wind shield protector including, in combination, a pair of upright standards and means for adjustably attaching the same to the ends of the wind shield frame, a forwardly extending frame including upper and lower side bars secured in hinged relation to each other at their forward ends, said upper bars hinged at their rear ends to the upper portions of said standards, means adjustably connecting the ends of said lower bars to said standards, and a cover for said forwardly extending frame.

3. A wind shield protector including, in combination, a pair of slotted standards, a forwardly projecting frame including upper and lower side bars secured in hinged relation to each other at their forward ends, means for removably attaching the rear ends of said bars to the slotted standards, an opaque flexible cover for the upper portion of said frame, and means for adjustably attaching the slotted standards to the ends of the wind shield frame.

4. A wind shield protector including, in combination, a pair of standards, a forwardly projecting frame including upper and lower side bars, a divisible front bar to which said side bars are hingedly connected, the upper of said bars being hingedly connected at their rear ends to said standards, and the lower of said bars slidingly connected with said standards, a flexible cover for said frame, and means for adjustably connecting said standards to the upright portions of the wind shield frame.

JOSEPH BEDARD.